US008174576B2

(12) United States Patent
Akatsuka et al.

(10) Patent No.: US 8,174,576 B2
(45) Date of Patent: May 8, 2012

(54) VEHICLE PERIPHERY VIDEO PROVIDING APPARATUS AND METHOD

(75) Inventors: Takeshi Akatsuka, Yokohama (JP); Ken Oizumi, Tokyo (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 1539 days.

(21) Appl. No.: 11/517,361

(22) Filed: Sep. 8, 2006

(65) Prior Publication Data
US 2007/0070197 A1 Mar. 29, 2007

(30) Foreign Application Priority Data

Sep. 28, 2005 (JP) ................................. 2005-282077
Apr. 10, 2006 (JP) ................................. 2006-107912

(51) Int. Cl.
 H04N 7/18 (2006.01)
(52) U.S. Cl. ........................................ 348/148; 348/118
(58) Field of Classification Search .................. None
 See application file for complete search history.

(56) References Cited

U.S. PATENT DOCUMENTS

| 5,949,331 | A  | * | 9/1999  | Schofield et al. ............... 340/461 |
| 6,266,068 | B1 | * | 7/2001  | Kang et al. ....................... 345/629 |
| 7,034,861 | B2 |   | 4/2006  | Okada et al. |
| 7,139,412 | B2 | * | 11/2006 | Kato et al. ....................... 382/104 |
| 7,161,616 | B1 | * | 1/2007  | Okamoto et al. ............... 348/148 |
| 7,218,758 | B2 |   | 5/2007  | Ishii et al. |
| 7,221,364 | B2 | * | 5/2007  | Matsumoto et al. ........... 345/419 |
| 7,243,026 | B2 | * | 7/2007  | Kudo ............................... 701/301 |
| 7,298,247 | B2 | * | 11/2007 | Shimizu .......................... 340/435 |
| 7,307,655 | B1 |   | 12/2007 | Okamoto et al. |
| 7,317,813 | B2 | * | 1/2008  | Yanagawa et al. ............. 382/104 |
| 7,379,089 | B2 | * | 5/2008  | Takagi et al. ................... 348/148 |
| 7,505,047 | B2 | * | 3/2009  | Yoshimura ...................... 345/620 |
| 7,643,911 | B2 | * | 1/2010  | Ishihara et al. .................... 701/1 |
| 7,974,473 | B2 | * | 7/2011  | Nanbu ............................. 382/209 |
| 2002/0175999 | A1 | * | 11/2002 | Mutobe et al. ................ 348/148 |
| 2002/0196340 | A1 | * | 12/2002 | Kato et al. ...................... 348/148 |
| 2003/0108222 | A1 | * | 6/2003  | Sato et al. ....................... 382/104 |
| 2004/0004541 | A1 | * | 1/2004  | Hong ............................... 340/435 |
| 2004/0066978 | A1 | * | 4/2004  | Nanbu ............................. 382/261 |
| 2004/0201759 | A1 | * | 10/2004 | Horiuchi ......................... 348/254 |
| 2007/0003162 | A1 |   | 1/2007  | Miyoshi et al. |
| 2010/0054580 | A1 |   | 3/2010  | Miyoshi et al. |

FOREIGN PATENT DOCUMENTS

| JP | 10-299032 A | 11/1998 |
| JP | 2002-27448 A | 1/2002 |
| JP | 2002-83285 A | 3/2002 |
| JP | 2002-135765 A | 5/2002 |
| JP | 2002-166802 A | 6/2002 |
| JP | 3300334 B2 | 7/2002 |
| JP | 2002-359838 A | 12/2002 |
| JP | 2004-034957 A | 2/2004 |
| JP | 2004-64131 A | 2/2004 |
| JP | 2005-184142 A | 7/2005 |
| JP | 2005-184225 A | 7/2005 |

(Continued)

*Primary Examiner* — Mehrdad Dastouri
*Assistant Examiner* — James Anderson, II
(74) *Attorney, Agent, or Firm* — Foley & Lardner LLP

(57) ABSTRACT

A vehicle periphery video providing apparatus performs coordinate conversion for a video shot by a shooting device so that the same video as in a case where a vehicle outside is visible from an eye point position of a driver in such a manner that an installed area of a liquid crystal display becomes transparent can be displayed on the liquid crystal display.

8 Claims, 9 Drawing Sheets

FOREIGN PATENT DOCUMENTS

| | | |
|---|---|---|
| JP | 2005-212709 A | 8/2005 |
| JP | 2005-311666 A | 11/2005 |
| WO | WO 00/07373 A1 | 2/2000 |
| WO | WO 2005/088970 A1 | 9/2005 |

* cited by examiner

VEHICLE PERIPHERY VIDEO PROVIDING APPARATUS AND METHOD

BACKGROUND OF THE INVENTION

1. Field of the Invention

The present invention relates to a vehicle periphery video providing apparatus which provides, to a driver, a video obtained by shooting a periphery of a vehicle.

2. Description of the Related Art

A vehicle periphery video providing apparatus has been known, which displays, on a monitor, a periphery of a vehicle, which becomes a blind spot to a driver by a vehicle structural member (for example, a pillar). This apparatus shoots the periphery of the vehicle by a camera installed outside of a vehicle cabin, and displays a video obtained by the shooting on the monitor provided at a position of the vehicle structural member (refer to Japanese Patent Laid-Open Publication No. 2004-34957).

SUMMARY OF THE INVENTION

However, since the above-described vehicle periphery video providing apparatus directly displays the video shot by the camera on the monitor, the video displayed on the monitor and a scene on the periphery of the monitor, which is visible through windows, cannot look continuous with each other. Accordingly, the driver feels wrong.

Moreover, it is supposed that the video shot by the camera is subjected to coordinate conversion so that the video shot by the camera and the scene visible through the windows can look continuous with each other. In this case, when an obstruction is present in the video shot by the camera, the displayed video will be the one with a feeling of wrongness even if the coordinate conversion is performed therefor.

The present invention has been made in order to solve such a problem. It is an object of the present invention to provide a vehicle periphery video providing apparatus and a vehicle periphery video providing method, which reduce the feeling of wrongness of the peripheral video of the vehicle, which becomes the blind spot, no matter where an eye point position of the driver may be located and no matter whether the obstruction may be present in the event of providing the peripheral video.

The first aspect of the present invention provides the vehicle periphery video providing apparatus according to the present invention is a vehicle periphery video providing apparatus which provides, to a driver, a video obtained by shooting a periphery of a vehicle, including: shooting means for shooting the periphery of the vehicle, the periphery becoming a blind spot to the driver by a structure of the vehicle; video processing means for processing the peripheral video of the vehicle, the video being shot by the shooting means; display means for displaying the video processed by the video processing means; and distance detecting means for detecting a distance to an obstruction present on a shooting direction side of the shooting means, wherein, based on information regarding an eye point position of the driver and information regarding an installed state of the display means, the video processing means performs coordinate conversion for the video shot by the shooting means so that a same video as in a case where a vehicle outside is visible from the eye point position of the driver in such a manner that an installed area of the display means becomes transparent can be displayed on the display means, sets a reference surface of the coordinate conversion at a position of the distance to the obstruction, the distance being detected by the distance detecting means, and performs the coordinate conversion for the reference surface.

The second aspect of the present invention provides the vehicle periphery video providing method according to the present invention is a vehicle periphery video providing method which provides a video obtained by shooting a periphery of a vehicle to a driver by display means, the method including: shooting the periphery of the vehicle, the periphery becoming a blind spot to the driver by a structure of the vehicle; detecting a distance to an obstruction present on a shooting direction side; based on information regarding an eye point position of the driver and information regarding an installed state of the display means, performing coordinate conversion for the shot video so that a same video as in a case where a vehicle outside is visible from the eye point position of the driver in such a manner that an installed area of the display means becomes transparent can be displayed on the display means, setting a reference surface of the coordinate conversion at a position of the detected distance to the obstruction, and performing the coordinate conversion for the reference surface; and displaying the video subjected to the coordinate conversion.

BRIEF DESCRIPTION OF THE DRAWINGS

The invention will now be described with reference to the accompanying drawings wherein.

DETAILED DESCRIPTION OF THE PREFERRED EMBODIMENT

Hereinafter, a description is given of embodiments of the present invention with reference to the drawings.

Figure 1:
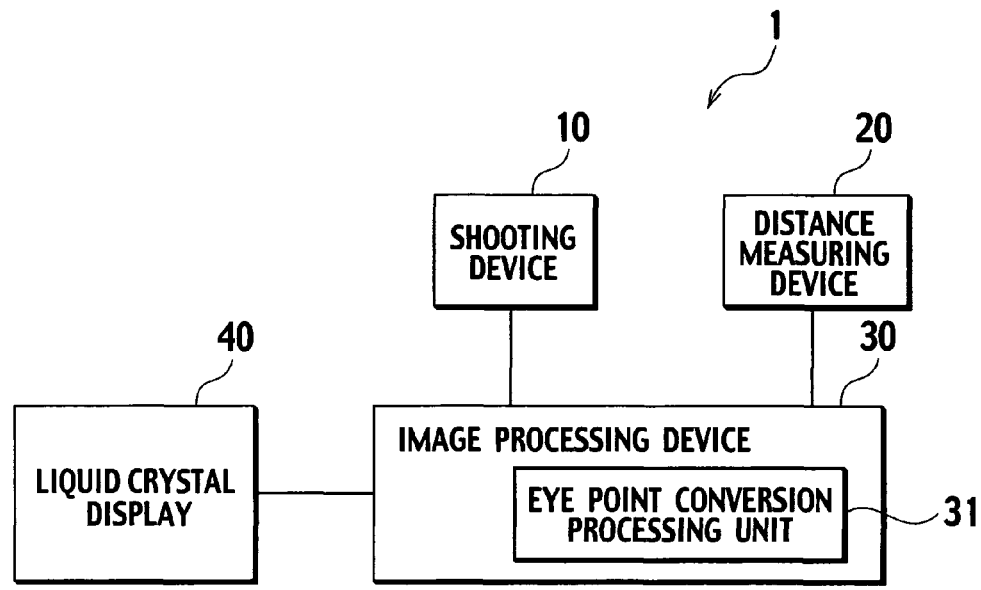
FIG. 1 is a configuration view of a vehicle periphery video providing apparatus of a first embodiment of the present invention.

FIG. 1 is a configuration view of a vehicle periphery video providing apparatus of a first embodiment of the present invention. As shown in FIG. 1, the vehicle periphery video providing apparatus 1 of the first embodiment provides, to a driver, a video obtained by shooting a periphery of a vehicle. The vehicle periphery video providing apparatus 1 includes a shooting device 10, a distance measuring device 20, an image processing device 30, and a liquid crystal display 40.

The shooting device 10 shoots the periphery of the vehicle, which becomes a blind spot to the driver by a structure of the vehicle. The shooting device 10 is composed of a CCD (Charge-Coupled Device) camera or a CMOS (Complementary Metal Oxide Semiconductor) camera. The shooting device 10 transmits a video signal obtained by the shooting to the image processing device 30.

The distance measuring device 20 detects a distance to an obstruction present in a shooting direction of the shooting device 10. The distance measuring device 20 is composed of a sonar, a laser radar, and the like. Moreover, the distance measuring device 20 transmits, to the image processing device 30, information regarding the detected distance to the obstruction.

The image processing device 30 processes the peripheral video of the vehicle, which is shot by the shooting device 10, based on information regarding an eye point position of the driver. The image processing device 30 is composed of a microcomputer and a memory. Specifically, the image processing device 30 is composed of an application specific integrated circuit (ASIC) and a field programmable gate array (FPGA), which incorporate operation programs and respective pieces of processing thereof. Moreover, the image processing device 30 transmits the processed video to the liquid crystal display 40.

The liquid crystal display 40 displays the video processed by the image processing device 30. The liquid crystal display 40 is installed on each of pillars (so-called A pillars) supporting a roof of the vehicle on a vehicle front side, an instrument panel between a driver's seat and a passenger's seat, and pillars (so-called C pillars) on a vehicle rear side.

The above-described image processing device 30 includes an eye point conversion unit 31. The eye point conversion unit 31 performs coordinate conversion for the video shot by the shooting device 10 based on prestored information regarding an eye point and prestored information regarding an installed state (installed position and installed area) of each liquid crystal display 40 so that the same video as in the case where the vehicle outside is visible from an eye point position of the driver in such a manner that the installed area of each liquid crystal display 40 becomes transparent can be displayed on each liquid crystal display 40.

Figure 2:
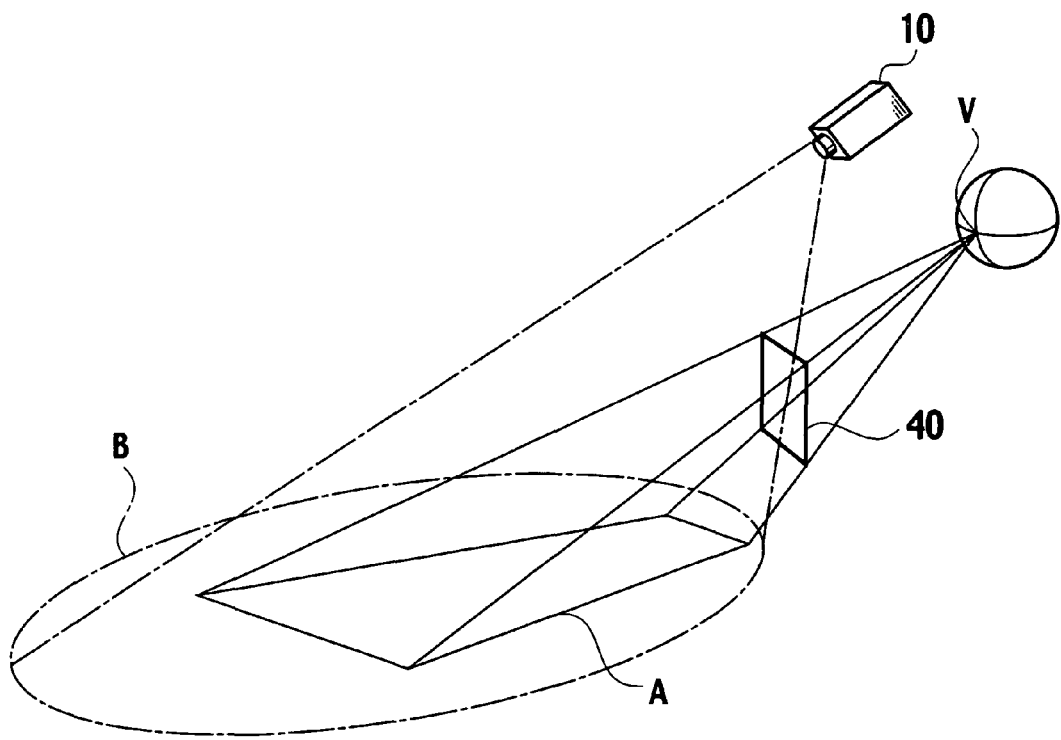
FIG. 2 is a view showing details of an eye point conversion processing unit of FIG. 1.

FIG. 2 is a view showing details of the eye point conversion processing unit 31 of FIG. 1. As shown in FIG. 2, if the installed area of the liquid crystal display 40 becomes transparent, then an area A is visible from an eye point position V of the driver. The shooting device 10 shoots an area B including the area A. The eye point conversion processing unit 31 takes out a video of the area A obtained from information regarding an eye point position V and the installed state of the liquid crystal display 40 from the area B shot by the shooting device 10. Moreover, the eye point conversion processing device 31 performs the coordinate conversion for the video of the area A, and creates a video (hereinafter, referred to as a "transmitted video") looking like that the vehicle outside is visible from the driver in such a manner that the liquid crystal display 40 becomes transparent.

Figure 3:
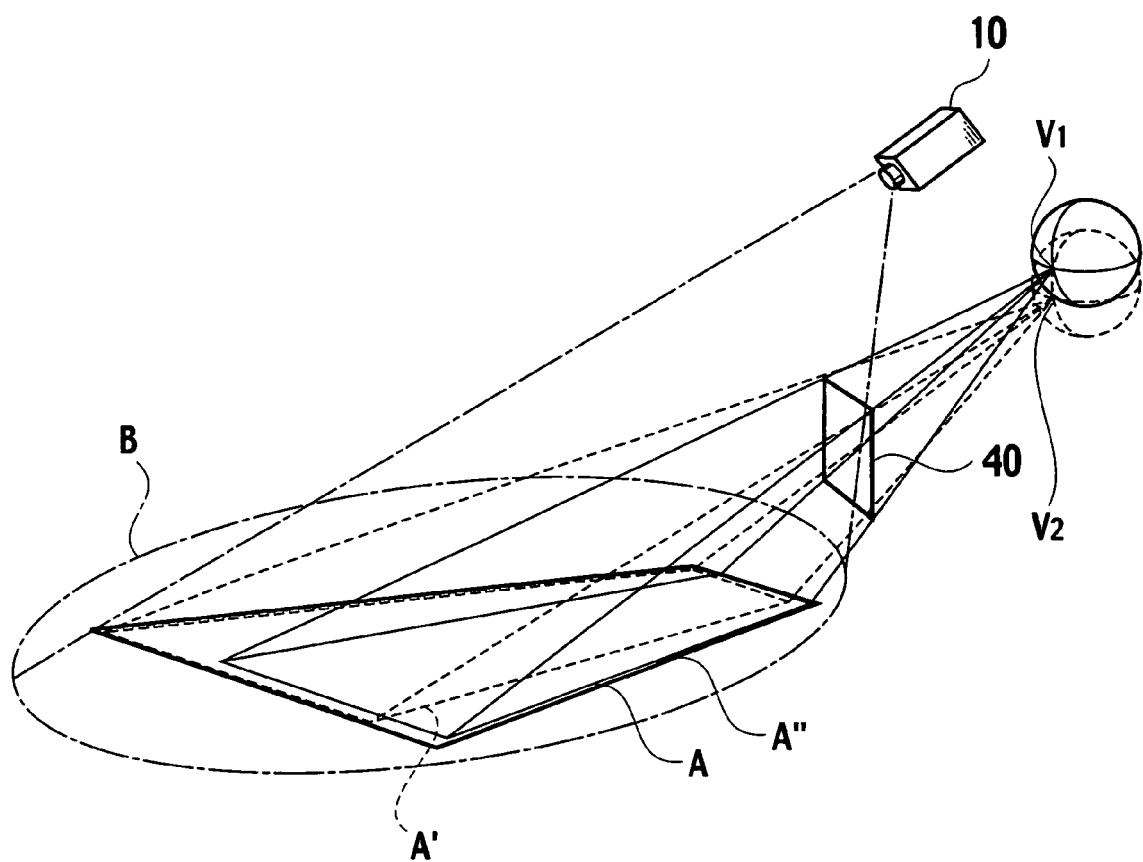
FIG. 3 is a second view showing the details of the eye point conversion processing unit of FIG. 1.

FIG. 3 is a second view showing the details of the eye point conversion processing unit 31. It is preferable that the eye point conversion processing unit 31 store information regarding a plurality of the eye point positions V. In this case, the eye point conversion processing unit 31 obtains areas visible from the plurality of eye point positions V when the installed area of the liquid crystal display 40 becomes transparent. Then, the eye point conversion processing unit 31 displays, on the liquid crystal display 40, a large area including all of the obtained areas.

A description will be made of an example of the case where the eye point conversion processing unit 31 stores the information regarding two eye point positions V1 and V2 with reference to FIG. 3. In this case, the eye point conversion processing unit 31 obtains the area A visible from the first eye point positions V1. Moreover, the eye point conversion processing unit 31 obtains an area A' visible from the second eye point position V2. Then, the eye point conversion processing unit 31 obtains a large area A" including both of the areas A and A'. Subsequently, the eye point conversion processing unit 31 performs the coordinate conversion for the large area A" so that the large area A" can be displayed on the liquid crystal display 40.

The plurality of eye point positions V stored in the eye point conversion processing unit 31 are present in an area where human eyes are present with a high probability. A driving posture is determined to some extent. Accordingly, the area where the human eyes are present with a high probability can be obtained in consideration of a physique of the driver in addition to the driving posture. Then, the eye point conversion processing unit 31 stores the area where the human eyes are present with a high probability or a representative point in the area.

Moreover, the eye point conversion processing unit 31 sets a reference surface of the coordinate conversion, which is vertical to the horizontal surface, at a point of the distance to the obstruction, the distance being detected by the distance measuring device 20, and performs the coordinate conversion therefor. The reference surface of the coordinate conversion refers to a surface to be subjected to the coordinate conversion. In the conventional apparatus, the reference surface of the coordinate conversion is set on the ground (or a surface horizontal thereto).

Figure 4A:
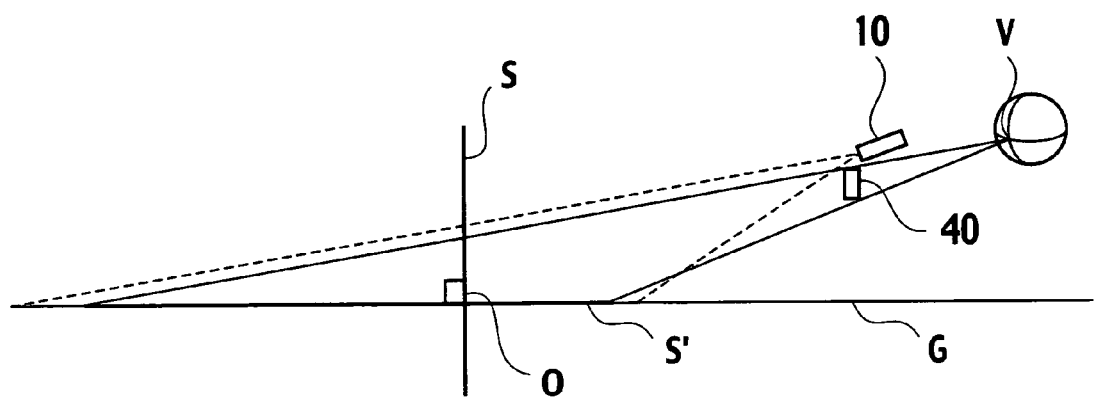
FIG. 4A is a third view showing the details of the eye point conversion processing unit of FIG. 1, showing a reference surface.
Figure 4B:
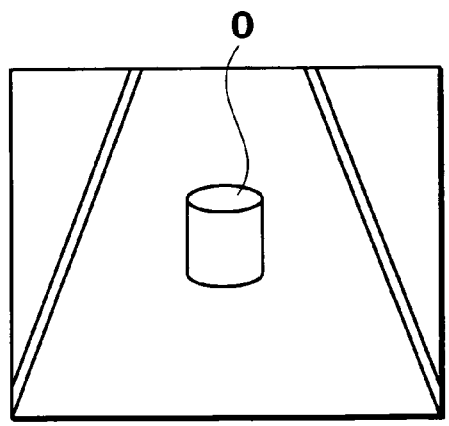
FIG. 4B is a third view showing the details of the eye point conversion processing unit of FIG. 1, showing a video when a liquid crystal display becomes transparent.
Figure 4C:
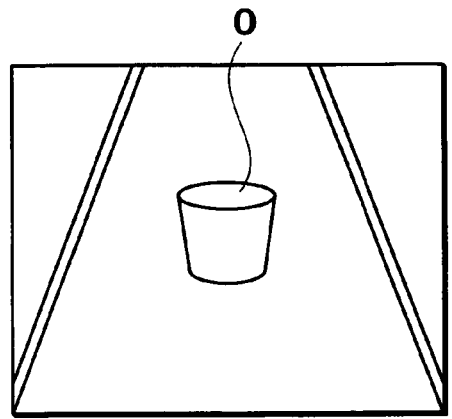
FIG. 4C is a third view showing the details of the eye point conversion processing unit of FIG. 1, showing a video when coordinate conversion is performed on a conventional reference surface.

FIGS. 4A to 4C are third views showing the details of the eye point conversion processing unit 31 of FIG. 1. FIG. 4A shows the reference surface, FIG. 4B shows a video when the liquid crystal display 40 becomes transparent, and FIG. 4C shows a video in the case where the coordinate conversion is performed for the conventional reference surface.

It is supposed that the reference surface S' of the coordinate conversion is set on the ground G. In this case, when the liquid crystal display 40 becomes transparent, an obstruction O as a cylindrical structural object should be displayed on the liquid crystal display 40 while keeping a cylindrical shape thereof without distortion. However, when the reference surface S' of the coordinate conversion is set on the ground G, as shown in FIG. 4C, an upper side of the obstruction O displayed on the liquid crystal display 40 is magnified, causing the distortion.

Figure 5:
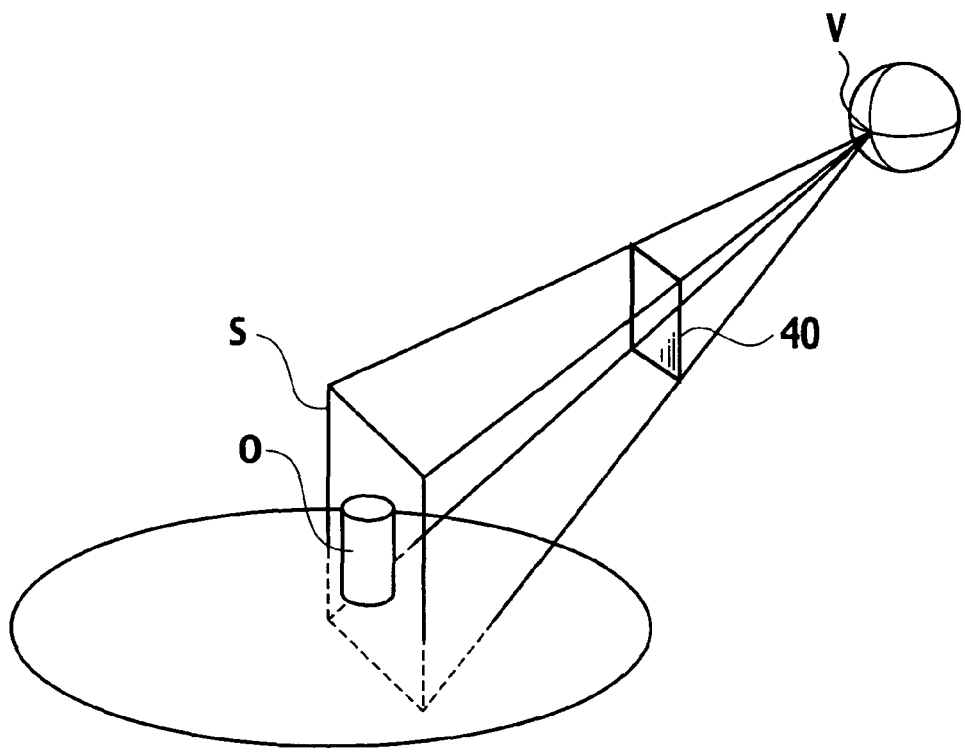
FIG. 5 is a fourth view showing the details of the eye point conversion processing unit of FIG. 1.

Therefore, the eye point conversion processing unit 31 sets the vertical reference surface S of the coordinate conversion at the position of the distance to the obstruction, which is detected by the distance measuring device 20 (FIG. 4A). FIG. 5 is a fourth view showing the details of the eye point conversion processing unit 31 of FIG. 1. As shown in FIG. 5, the eye point conversion processing unit 31 sets the vertical reference surface S of the coordinate conversion at the position of the distance to the obstruction O. Then, the eye point conversion processing unit 31 converts coordinates of the reference surface S into coordinates of the liquid crystal display 40 so that the vehicle outside can be visible in such a manner that the liquid crystal display 40 becomes transparent. Thus, in the obstruction O distorted as shown in FIG. 4C, the distortion thereof is reduced like the obstruction O shown in FIG. 4B.

Note that, though the eye point conversion processing unit 31 sets the reference surface S of the coordinate conversion vertically in the above description, the reference surface S of the coordinate conversion just needs to be set at an angle which is not at least parallel to the ground G without being limited to the above. Thus, the distortion can be reduced more than in the conventional case.

Figure 6:
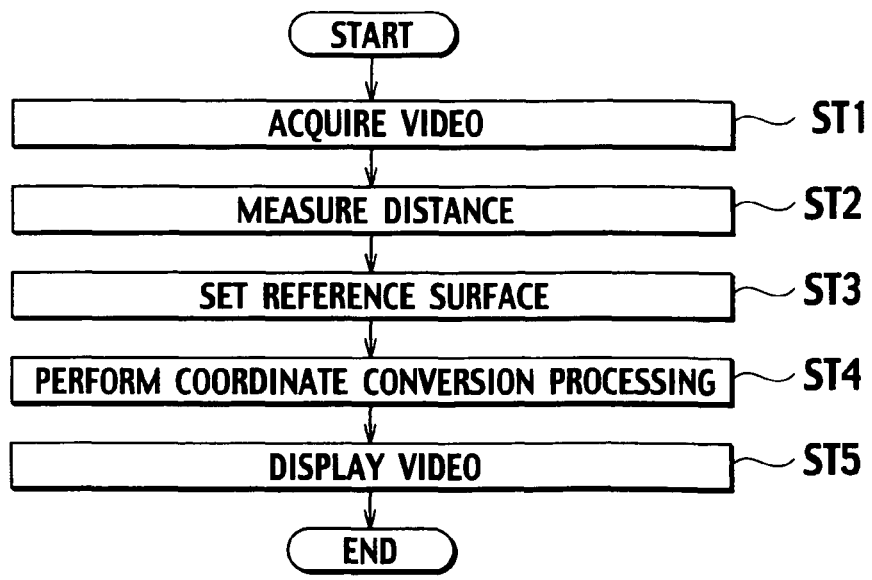
FIG. 6 is a flowchart showing a detailed operation of the vehicle periphery video providing apparatus of the first embodiment.

Next, a description will be made of a detailed operation of the vehicle periphery video providing apparatus 1 of this embodiment. FIG. 6 is a flowchart showing the detailed operation of the vehicle periphery video providing apparatus 1 of the first embodiment. As shown in FIG. 6, the shooting device 10 first acquires the video of the periphery of the vehicle, which becomes the blind spot (ST1).

Next, the distance measuring device 20 detects the distance to the obstruction O (ST2). Next, the eye point conversion processing unit 31 sets the reference surface S of the coordinate conversion (ST3). In this case, the eye point conversion processing unit 31 sets the vertical reference surface S at the position of the distance to the obstruction O. However, when the distance to the obstruction O, which is detected by the distance measuring device 20, is a predetermined distance or more, the eye point conversion processing unit 31 does not set the reference surface S of the coordinate conversion at the position of the distance to the obstruction O, but sets the reference surface S of the coordinate conversion on the ground. In the case where the obstruction O is present extremely far, when the reference surface S of the coordinate conversion is set at the position of the obstruction O, a white line and the like, which are drawn on the ground G on the front side of the obstruction O, are distorted, causing a possibility to give a feeling of wrongness to the driver on the contrary. This is the reason to set the reference surface S on the ground G as described above. Note that the predetermined distance may be set at such a distance where a possibility that the vehicle and the obstruction O may contact each other is extremely low, or may be set at a distance beyond the area B shot by the shooting device 10. Specifically, the predetermined distance is 10 m and 20 m.

Moreover, when distances to a plurality of the obstructions O are detected by the distance measuring device 20, the eye point conversion processing unit 31 sets the reference surface S of the coordinate conversion at a position of the closest distance to the obstruction O among the distances to the plurality of obstructions O in Step ST3. Thus, the video of the obstruction O present close to the vehicle, which can be said to have the highest possibility to contact the vehicle, can be displayed without the distortion.

After setting the reference surface S of the coordinate conversion in such a manner as described above, the eye point conversion processing unit 31 performs the coordinate conversion processing in such a manner as shown in FIG. 5 (ST4). Thereafter, the liquid crystal display 40 displays the video processed in Step ST4 (ST5). Then, the above-described processing is repeated until a power supply of the vehicle periphery video providing apparatus 1 is turned off.

In such a manner, the vehicle periphery video providing apparatus 1 performs the coordinate conversion for the video shot by the shooting device 10 based on the information regarding the acquired eye point position V and the information regarding the installed state of the liquid crystal display 40. In this case, the vehicle periphery video providing apparatus 1 performs the coordinate conversion for the video shot by the shooting device 10 so that the same video as in the case where the vehicle outside is visible from the eye point position V of the driver in such a manner that the installed area of the liquid crystal display 40 becomes transparent can be displayed on the liquid crystal display 40. Therefore, the video displayed on the liquid crystal display 40 becomes the one looking like that the vehicle outside is visible in such a manner that the liquid crystal display 40 becomes transparent. Thus, the video displayed on the liquid crystal display 40 and a scene visible though windows in the periphery of the liquid crystal display 40 look continuous with each other. Hence, it becomes difficult for the driver to feel wrong. In particular, the reference surface S of the coordinate conversion is set at the position of the distance to the obstruction O, and the coordinate conversion is performed based on the reference surface S. Therefore, the distortion of the obstruction O owing to the coordinate conversion is reduced. Hence, the feeling of wrongness can be reduced no matter where the eye point position V of the driver may be located and no matter whether the obstruction may be present in the event of providing the peripheral video of the vehicle, which becomes the blind spot, to the driver.

Moreover, the eye point conversion processing unit 31 performs the coordinate conversion for the video shot by the shooting device 10 so that the video (video of the area A") of the range including all of the videos (videos of the area A and the area A') when the vehicle outside is visible from the plurality of eye point positions V in such a manner that the installed area of the liquid crystal display 40 becomes transparent can be displayed on the liquid crystal display 40. Thus, even if the visible range differs depending on differences of the posture and physique of the driver, the area where the installed area of the liquid crystal display 40 becomes transparent is displayed. Hence, the driver can be allowed to visually recognize the necessary range without depending on the differences of the posture and physique of the driver.

Moreover, when the distance to the obstruction O, which is detected by the distance measuring device 20, is the predetermined distance or more, the eye point conversion processing unit 31 does not set the reference surface S of the coordinate conversion at the position of the distance to the obstruction O, but sets the reference surface S of the coordinate conversion on the ground G. In the case where the obstruction O is present extremely far, when the reference surface S of the coordinate conversion is set at the position of the obstruction O, the white line and the like, which are drawn on the ground G on the front side of the obstruction O, are distorted, causing the possibility to give the feeling of wrongness to the driver on the contrary. Accordingly, when the distance to the obstruction O is the predetermined distance or more, the reference surface S of the coordinate conversion is set on the ground G, thus making it possible to reduce the feeling of wrongness of the displayed video.

Moreover, when the distances to the plurality of obstructions O are detected by the distance measuring device 20, the eye point conversion processing unit 31 sets the reference surface S of the coordinate conversion at the position of the closest distance to the obstruction O among the distances to the plurality of obstructions O. Accordingly, the video of the obstruction O present close to the vehicle, which can be thus said to have the highest possibility to contact the vehicle, can be displayed without the distortion.

Next, a description will be made of a second embodiment of the present invention. A vehicle periphery video providing apparatus of the second embodiment is similar to that of the first embodiment, but is partially different therefrom in configuration and processing contents. Differences of the second embodiment from the first embodiment will be described below.

Figure 7:
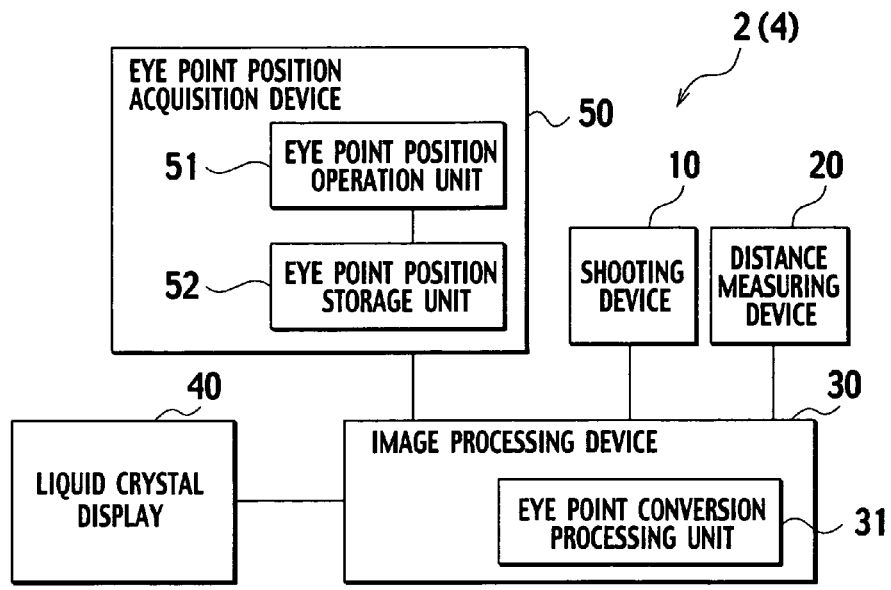
FIG. 7 is a configuration view of a vehicle periphery video providing apparatus of a second embodiment of the present invention.

FIG. 7 is a configuration view of the vehicle periphery video providing apparatus of the second embodiment of the present invention. As shown in FIG. 7, the vehicle periphery video providing apparatus 2 of the second embodiment includes an eye point position acquisition device 50.

The eye point position acquisition device 50 acquires information regarding the eye point position V of the driver. The eye point position acquisition device 50 has an eye point position operation unit (operation unit) 51, and an eye point position storage unit 52. The eye point position operation unit 51 is a switch which allows an operation by the driver. Specifically, the eye point position operation unit 51 is composed of an eye point elevating switch, an eye point lowering switch, an eye point advancing switch, and an eye point retreating switch. The eye point position storage unit 52 stores a position set by the operation to the eye point position operation unit 51. The eye point position acquisition device 50 acquires the position stored by the eye point position storage unit 52 as the information regarding the eye point position V of the driver, and transmits the acquired information regarding the eye point position V to the image processing device 30.

Moreover, in the second embodiment, the eye point conversion processing unit 31 does not display the transmitted video based on the prestored information regarding the eye point position V, but displays the transmitted video based on the information regarding the eye point position V, which is acquired by the eye point position acquisition device 50.

Figure 8:
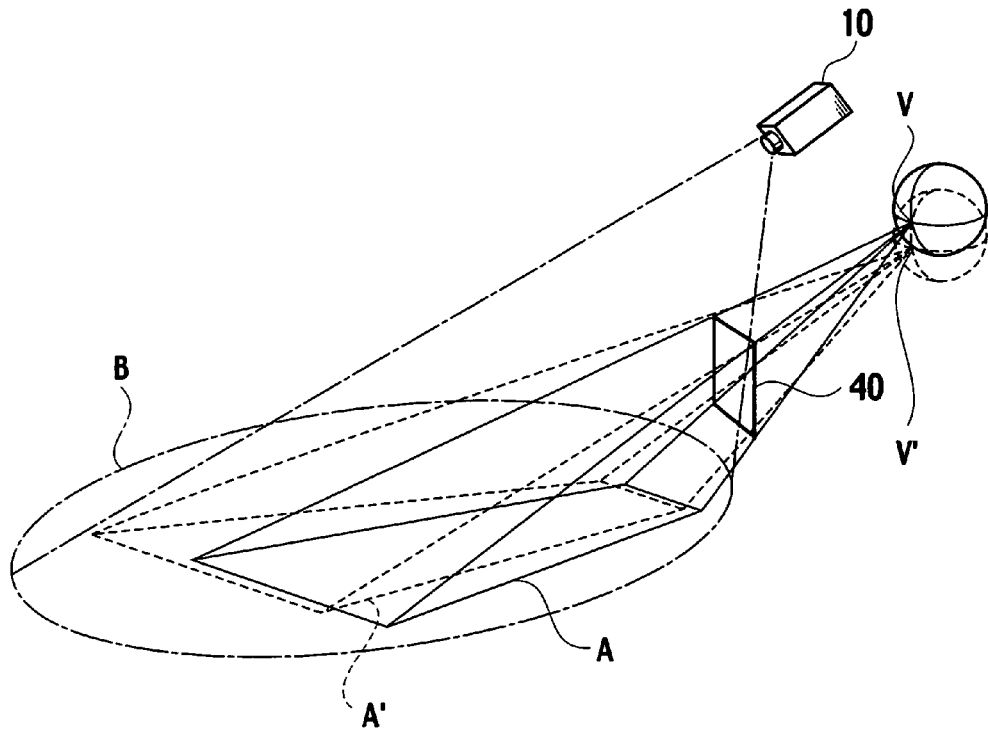
FIG. 8 is a view showing details of an eye point conversion processing unit of FIG. 7.

FIG. 8 is a view showing details of the eye point conversion processing unit 31 of FIG. 7. The eye point position V of the driver is affected by various factors such as the physique of the driver, a seat state, and the like. When the information regarding the eye point position V, which is acquired by the eye point position acquisition device 50, is changed, the eye point conversion processing unit 31 performs processing corresponding to the change concerned. It is assumed that the eye point position V of the driver moves to the lower left of the driver. In this case, when it is supposed that the installed area of the liquid crystal display 40 becomes transparent, the area A is invisible from an eye point position V' of the driver, and the area A' somewhat on the front right side of the area A is visible therefrom. Therefore, the eye point conversion processing unit 31 takes out the video of the area A', performs the coordinate conversion for a video corresponding to the area A', and creates the transmitted video. Thus, even if the eye point position V of the driver is changed, the video of the liquid crystal display 40 is adjusted, and the video looking like that the vehicle outside is visible in such a manner that the liquid crystal display 40 becomes transparent is displayed.

Figure 9:
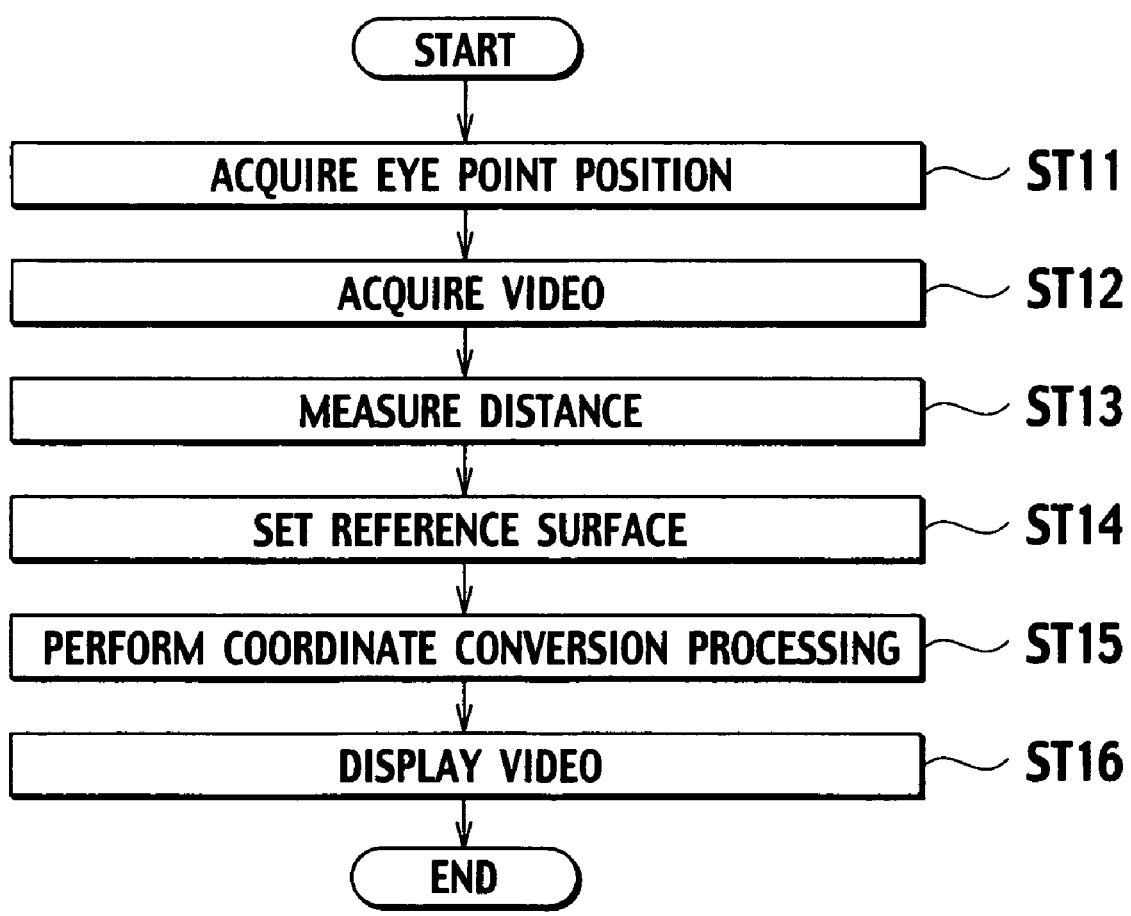
FIG. 9 is a flowchart showing a detailed operation of the vehicle periphery video providing apparatus of the second embodiment.

Next, a description will be made of a detailed operation of the vehicle periphery video providing apparatus 2 of the second embodiment. FIG. 9 is a flowchart showing the detailed operation of the vehicle periphery video providing apparatus 2 of the first embodiment. Note that processing in Steps ST12 to ST16 of FIG. 9 is similar to the processing in Steps ST1 to ST5 of FIG. 6, and accordingly, a description thereof will be omitted.

In the second embodiment, the eye point position acquisition unit 50 first acquires the information regarding the eye point position V of the driver (ST11). Thus, the area visible from the acquired eye point position V in such a manner that the liquid crystal display 40 becomes transparent is subjected to the coordinate conversion in ST15.

Figure 10:
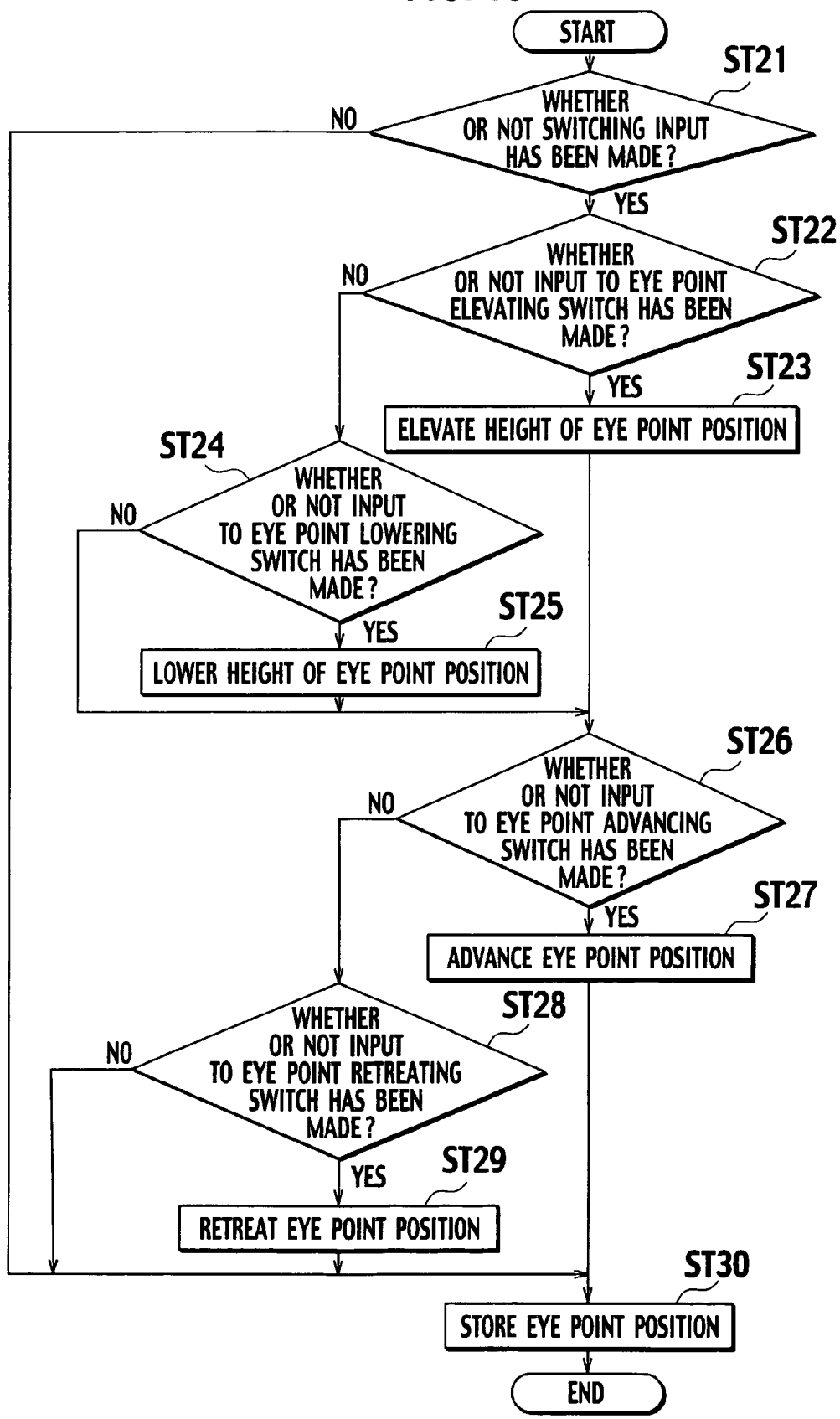
FIG. 10 is a flowchart showing processing of an eye point position acquisition device of FIG. 7.

Next, details of the eye point position acquisition device 50 will be described. FIG. 10 is a flowchart showing processing of the eye point position acquisition device 50 of FIG. 7. As shown in FIG. 10, first, the eye point position acquisition device 50 determines whether or not an switching input has been made to the eye point position operation unit 51 (ST21). When the eye point position acquisition device 50 has determined that no switching input has been made (ST21: NO), the processing proceeds to Step ST30.

Meanwhile, when the eye point position acquisition device 50 has determined that the switching input has been made (ST21: YES), the eye point position acquisition device 50 determines whether or not an input to the eye point elevating switch has been made (ST22). When the eye point position acquisition device 50 has determined that the input to the eye point elevating switch has been made (ST22: YES), the eye point position acquisition device 50 elevates height of the eye point position V to be stored (ST23) Then, the processing proceeds to Step ST26.

Moreover, when the eye point position acquisition device 50 has determined that no input to the eye point elevating switch has been made (ST22: NO), the eye point position acquisition device 50 determines whether or not an input to the eye point lowering switch has been made (ST24). When the eye point position acquisition device 50 has determined that no input to the eye point lowering switch has been made (ST24: NO), the processing proceeds to Step ST26. Meanwhile, when the eye point position acquisition device 50 has determined that the input to the eye point lowering switch has been made (ST24: YES), the eye point position acquisition device 50 lowers the height of the eye point position V to be stored (ST25), and the processing proceeds to Step ST26.

In Step ST26, the eye point position acquisition device 50 determines whether or not an input to the eye point advancing switch has been made (ST26). When the eye point position acquisition device 50 has determined that the input to the eye point advancing switch has been made (ST26: YES), the eye point position acquisition device 50 advances the eye point position V to be stored (ST27). Then, the processing proceeds to Step ST30.

Moreover, when the eye point position acquisition device 50 has determined that no input to the eye point advancing switch has been made (ST26: NO), the eye point position acquisition device 50 determines whether or not an input to the eye point retreating switch has been made (ST28). When the eye point position acquisition device 50 has determined that no input to the eye point retreating switch has been made (ST28: NO), the processing proceeds to Step ST30. Meanwhile, when the eye point position acquisition device 50 has determined that the input to the eye point retreating switch has been made (ST28: YES), the eye point position acquisition device 50 retreats the eye point position V to be stored (ST29), and the processing proceeds to Step ST30.

Then, in Step ST30, the eye point position storage unit 52 stores the eye point position V that has been moved (ST30). Thereafter, the above-described processing is repeated until a power supply of the vehicle periphery video providing apparatus 2 is turned off.

In such a manner, as in the first embodiment, the vehicle periphery video providing apparatus 2 of the second embodiment can reduce the feeling of wrongness no matter where the eye point position V of the driver may be located and no matter whether the obstruction may be present in the event of providing the peripheral video of the vehicle, which becomes the blind spot, to the driver. Moreover, when the distance to the obstruction O is the predetermined distance or more, the reference surface S of the coordinate conversion is provided on the ground G, thus making it possible to reduce the feeling of wrongness of the displayed video. Furthermore, the video of the obstruction O present close to the vehicle, which can be thus said to have the highest possibility to contact the vehicle, can be displayed without the distortion.

Furthermore, the vehicle periphery video providing apparatus 2 of the second embodiment performs the coordinate conversion for the video shot by the shooting device 10 based on the information regarding the eye point position V, which is acquired by the eye point position acquisition device 50, and on the information regarding the installed state of the liquid crystal display 40. Specifically, the vehicle periphery video providing apparatus 2 performs the coordinate conversion for the video shot by the shooting device 10 so that the same video as in the case where the vehicle outside is visible from the eye point position V of the driver, which is acquired by the eye point position acquisition device 50, in such a manner that the installed area of the liquid crystal display 40 becomes transparent can be displayed on the liquid crystal display 40. As described above, the eye point position V of the driver is obtained, and the coordinate conversion is thus performed. Accordingly, even if the eye point position V of the driver is changed, the video on the liquid crystal display 40 is adjusted, and the video looking like that the vehicle outside is visible in such a manner that the liquid crystal display 40 becomes transparent is displayed thereon. Hence, a video with a smaller feeling of wrongness can be displayed.

Next, a description will be made of a third embodiment of the present invention. A vehicle periphery video providing apparatus of the third embodiment is similar to that of the second embodiment, but is partially different therefrom in configuration and processing contents. Differences of the third embodiment from the second embodiment will be described below.

Figure 11:
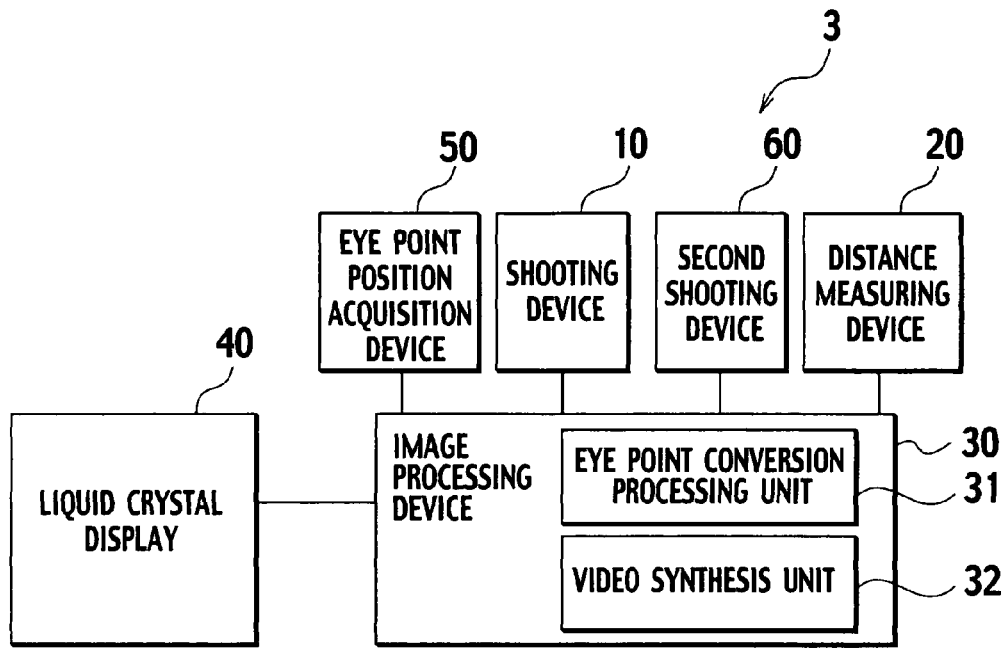
FIG. 11 is a configuration view of a vehicle periphery video providing apparatus of a third embodiment of the present invention.

FIG. 11 is a configuration view of the vehicle periphery video providing apparatus of the third embodiment of the present invention. As shown in FIG. 11, the vehicle periphery video providing apparatus 3 of the third embodiment includes a second shooting device 60. The second shooting device 60 shoots the periphery of the vehicle, which becomes the blind spot to the driver by the structure of the vehicle. The second shooting device 60 is provided separately from the shooting device 10. Specifically, the second shooting device 60 is composed of the CCD camera or the CMOS camera. The second shooting device 60 transmits a video signal obtained by the shooting to the image processing device 30.

Moreover, the image processing device 30 of the third embodiment includes a video synthesis unit 32. The video synthesis unit 32 synthesizes the video shot by the shooting device 10 and subjected to the coordinate conversion and the video shot by the second shooting device 60 and subjected to the coordinate conversion. By such synthesis, the vehicle periphery video providing apparatus 3 of the third embodiment can blur away backgrounds excluding the obstruction O, and can create a video in which the obstruction O is conspicuous.

Figure 12:
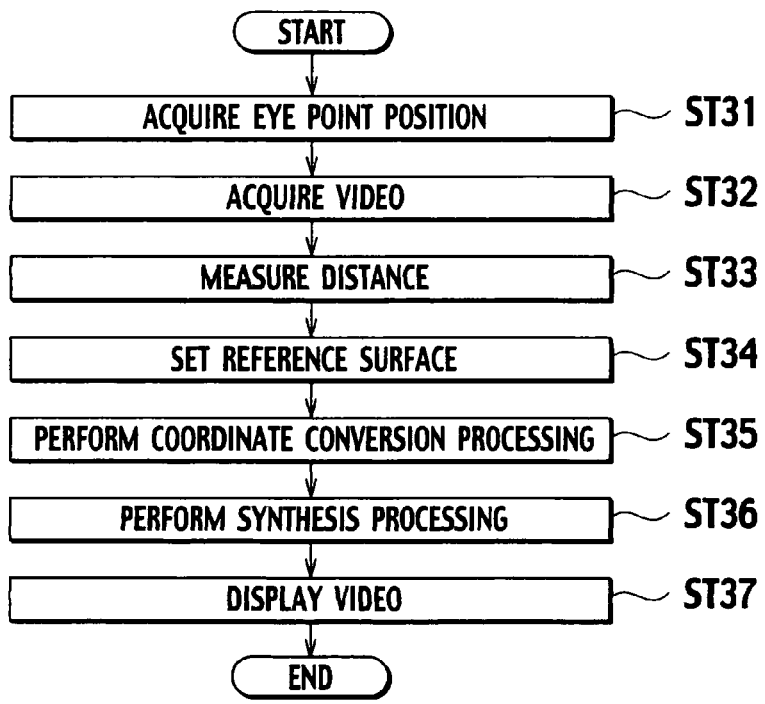
FIG. 12 is a flowchart showing a detailed operation of the vehicle periphery video providing apparatus of the third embodiment.

FIG. 12 is a flowchart showing a detailed operation of the vehicle periphery video providing apparatus 3 of the third embodiment. Note that, since processing of Steps ST31 to ST34 of FIG. 12 is the same as that of Steps ST11 to ST14 of FIG. 9, a description thereof will be omitted.

After setting the reference surface S of the coordinate conversion (after ST34), the eye point conversion processing unit 31 performs the coordinate conversion individually for the video shot by the shooting device 10 and the video shot by the second shooting device 60 (ST35). Subsequently, the video synthesis unit 32 synthesizes the respective videos subjected to the coordinate conversion (ST 36).

In this case, the video synthesis unit 32 first compares the respective videos subjected to the coordinate conversion with each other for each pixel. Next, when pixel values (for example, density values) of the compared pixels are the same, the video synthesis unit 32 takes the values of the compared pixels as a pixel value thereof. Moreover, when the pixel values are different from each other, the video synthesis unit 32 takes an average of values of peripheral pixels thereof as the pixel value of the compared pixels. Here, both of the videos are obtained in such a manner that the reference surface S of the coordinate conversion is set at the position of the obstruction O. Accordingly, with regard to the obstruction O, the pixel values of the compared pixels are easy to become the same. Meanwhile, with regard to other portions (backgrounds) excluding the obstruction O, the pixel values of the compared pixels are easy to become different from each other. Therefore, by such video synthesis processing, the video of the backgrounds becomes ambiguous and blurred. Thus, the video in which the obstruction O is conspicuous is created.

Then, the liquid crystal display 40 displays the video subjected to the video synthesis processing (ST37). Thereafter, the above-described processing is repeated until a power supply of the vehicle periphery video providing apparatus 3 is turned off.

Note that the following processing may be performed instead of the video synthesis processing of Step ST36. Specifically, the image processing apparatus 30 may also be adapted to perform blurring processing for blurring the portions of the video subjected to the coordinate conversion, which exclude the obstruction O. Here, the blurring processing refers, for example, to processing for adjusting a focal point. In a usual camera for use in the vehicle, a focal point thereof is set for an overall distance so that the camera can evenly shoot objects at various distances from a short distance to a long distance. However, in the blurring processing, the focal point is focused on the obstruction O, and the other portions are blurred. Thus, the video subjected to the blurring processing is displayed on the liquid crystal display 40, thus making it possible to provide the video in which the obstruction O is conspicuous to the driver.

Note that, without being limited to the above description, in the blurring processing, a method may be adopted, in which the obstruction O is specified, and the pixel values of the other image portions excluding the specified obstruction O are set at an average of the pixel values of the respective pixels and the pixel values of the peripheral pixels. Also by this method, the image portions excluding the obstruction O are blurred.

Moreover, the following processing may be performed instead of the video synthesis processing of Step ST36. The image processing device 30 may perform emphasis processing for emphasizing an edge of the obstruction O in the video subjected to the coordinate conversion. Here, the emphasis processing refers, for example, to processing for subtracting an output image obtained by applying a Laplacian filter to an original image from the original image. Moreover, the emphasis processing may be processing for drawing and adding a line to an outline portion of the obstruction O so that the obstruction can be conspicuous. By this emphasis processing, the video in which the obstruction O is conspicuous can be provided to the driver.

Note that the plurality of shooting means which are the shooting device 10 and the second shooting device 60 become necessary in the event of performing the video synthesis processing. However, in the event of performing the above-described blurring processing and emphasis processing, at least one shooting means just needs to be provided.

As described above, as in the second embodiment, the vehicle periphery video providing apparatus 3 of the third embodiment can reduce the feeling of wrongness no matter where the eye point position V of the driver may be located and no matter whether the obstruction may be present in the event of providing the peripheral video of the vehicle, which becomes the blind spot, to the driver. Moreover, the video with a smaller feeling of wrongness can be displayed. Furthermore, when the distance to the obstruction O is the predetermined distance or more, the reference surface S of the coordinate conversion is provided on the ground G, thus making it possible to reduce the feeling of wrongness of the displayed video. Furthermore, the video of the obstruction O present close to the vehicle, which can be thus said to have the highest possibility to contact the vehicle, can be displayed without the distortion.

Moreover, the vehicle periphery video providing apparatus 3 of the third embodiment compares the respective videos subjected to the coordinate conversion with each other for each pixel, and when the pixel values (for example, density values) of the compared pixels are the same, takes the values of the compared pixels as the pixel value thereof. Moreover, when the pixel values of the compared pixels are different from each other, the vehicle periphery video providing apparatus 3 takes the average of the pixel values of the peripheral pixels thereof as the pixel value of the compared pixels. Here, both of the videos are obtained in such a manner that the position of the obstruction O is set on the reference surface S of the coordinate conversion. Accordingly, with regard to the obstruction O, the pixel values of the compared pixels are easy to become the same. Meanwhile, with regard to the other portions (backgrounds) excluding the obstruction O, the pixel values of the compared pixels are easy to become different from each other. Therefore, by such video synthesis processing, the video of the backgrounds becomes ambiguous and blurred. Hence, the video in which the obstruction O is conspicuous can be provided to the driver.

Furthermore, the vehicle periphery video providing apparatus 3 performs the blurring processing for blurring the portions of the video subjected to the coordinate conversion, which exclude the obstruction O, and displays the video subjected to the blurring processing. Accordingly, to the driver, a video can be provided, in which the backgrounds are blurred and the obstruction O is conspicuous.

Furthermore, the vehicle periphery video providing apparatus 3 performs the emphasis processing for emphasizing the edge of the obstruction O in the video subjected to the coordinate conversion, and displays the video subjected to the emphasis processing. Accordingly, the video in which the obstruction O is conspicuous is created, thus making it possible to provide the video in which the obstruction O is conspicuous to the driver.

Next, a description will be made of a fourth embodiment of the present invention. A vehicle periphery video providing apparatus of the fourth embodiment is similar to that of the second embodiment, but is partially different therefrom in processing contents. Differences of the fourth embodiment from the second embodiment will be described below.

Figure 13:
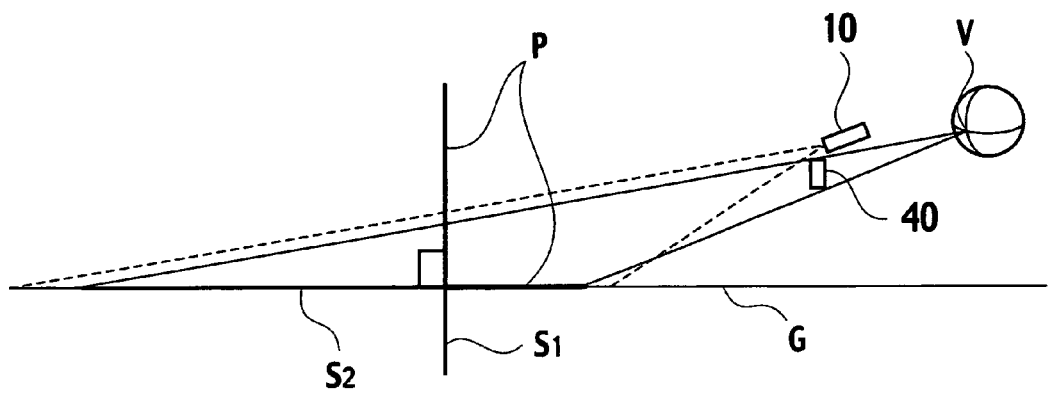
FIG. 13 is a view explaining an eye point conversion processing unit of a fourth embodiment.

FIG. 13 is a view explaining the eye point conversion processing unit 31 of the fourth embodiment. The eye point conversion processing unit 31 does not only set a reference surface S1 of the coordinate conversion at the point of the obstruction O, which is detected by the distance measuring device 20, but also sets a second reference surface S2 on the ground G. Then, the eye point conversion processing unit 31 performs the coordinate conversion for the front side of the obstruction O based on the second reference surface S2, and for the other portions based on the reference surface S1.

Thus, the distortion of the white line and the like on the area of the front side of the obstruction O is reduced by the coordinate conversion based on the second reference surface S2. Moreover, the distortion of the obstruction O is reduced based on the coordinate conversion based on the reference surface S1. Therefore, the distortion of the obstruction O is reduced, and the distortion of the white line and the like, which are drawn on the ground G in front of the obstruction O, is reduced. Hence, a video in which the feeling of wrongness is further reduced can be provided.

As described above, as in the second embodiment, the vehicle periphery video providing apparatus 4 of the fourth embodiment can reduce the feeling of wrongness no matter where the eye point position V of the driver may be located and no matter whether the obstruction may be present in the event of providing the peripheral video of the vehicle, which becomes the blind spot, to the driver. Moreover, the video with a smaller feeling of wrongness can be displayed. Furthermore, when the distance to the obstruction O is the predetermined distance or more, the reference surface S of the coordinate conversion is provided on the ground G, thus making it possible to reduce the feeling of wrongness of the displayed video. Furthermore, the video of the obstruction O present close to the vehicle, which can be thus said to have the highest possibility to contact the vehicle, can be displayed without the distortion.

Moreover, the vehicle periphery video providing apparatus 4 of the fourth embodiment does not only set the reference surface S1 of the coordinate conversion at the position of the obstruction O, but also sets the second reference surface S2 on the ground G. Then, the vehicle periphery video providing apparatus 4 performs the coordinate conversion for the front side of the obstruction O based on the second reference surface S2, and for the other portions based on the reference surface S1. Accordingly, the distortion of the obstruction O is reduced, and the distortion of the white line drawn on the ground G in front of the obstruction O is reduced. Hence, the video in which the feeling of wrongness is further reduced can be provided.

Although the description has been made above of the present invention based on the embodiments, the present invention is not limited to the above-described embodiments. Alterations may be added to the embodiments within the scope without departing from the gist of the present invention, and the respective embodiments may be combined.

Figure 14:
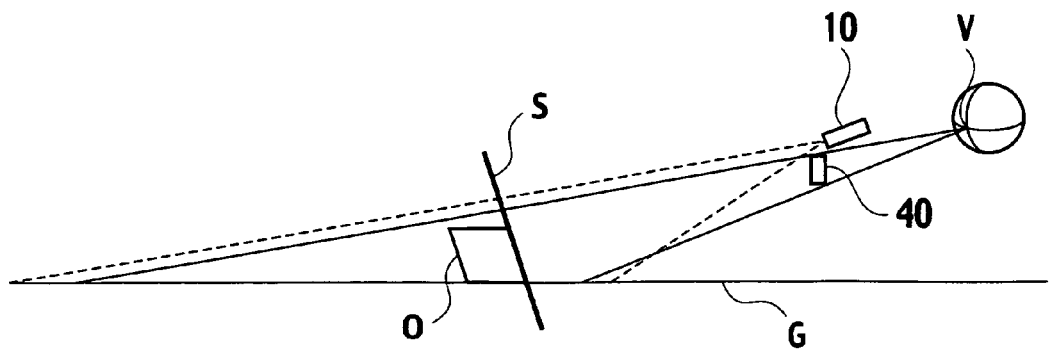
FIG. 14 is a view explaining a reference surface along a shape of an obstruction O.

Although the vertical reference surface S is set at the position of the obstruction O, the reference surface S may be set as below without being limited to this. Each of the vehicle periphery video providing apparatuses 1 to 4 may include shape detecting means for detecting a shape of the obstruction O, and may set the reference surface S along the shape detected by the shape detecting means. FIG. 14 is a view showing the reference surface S along the shape of the obstruction O. As shown in FIG. 14, when the obstruction S stands obliquely with respect to the ground G, the reference surface S is set obliquely along the shape of the obstruction O. Thus, the obstruction O which stands obliquely is not displayed so as to be distorted, but is displayed accurately.

Moreover, when the vehicle periphery video providing apparatus includes the plurality of shooting means as in the third embodiment, the vehicle periphery video providing apparatus may be adapted to detect the distance to the obstruction O by using the videos from the plurality of shooting means.

The entire contents of Japanese Patent Application No. P2005-282077 with a filing date of Sep. 28, 2005 and P2006-107912 with a filing date of Apr. 10, 2006 are herein incorporated by reference.

What is claimed is:

1. A vehicle periphery video providing apparatus comprising:
   a first shooting device adapted to shoot a first video of the periphery of a vehicle at a location that is not visible to a driver due to a structural member of the vehicle;
   a second shooting device adapted to shoot a second video of the periphery of the vehicle at the location that is not visible to the driver due to the structural member of the vehicle, the second shooting device being located separately from the first shooting device and;
   a distance detection device adapted to detect a distance to an obstruction present on a shooting direction side of the first and second shooting devices;
   a video processing device adapted for:
      setting a vertical reference surface at a location of the obstruction,
      performing coordinate conversion on the first and second videos based on (i) the location of the vertical reference surface, (ii) information regarding at least one eye point position of the driver, and (iii) information regarding an installed state of the display device, and
      providing a synthesis processed video by performing video synthesis processing on the first and second videos, the synthesis processing comprising:
         comparing pixel values of each pixel of the first video with pixel values of each corresponding pixel of the second video,
         when a pixel value of a pixel of the first video is the same as a pixel value of a corresponding pixel of the second video, setting the pixel value of the compared pixels as the pixel value of the corresponding pixel in the synthesis processed video, and
         when a pixel value of a pixel of the first video is different from a pixel value of a corresponding pixel of the second video, determining an average of pixel values of peripheral pixels of the compared pixels and setting the average as the pixel value of the corresponding pixel in the synthesis processed video; and
   a display device adapted to display the synthesis processed video, the display device being disposed at a location of the structural member.

2. The vehicle periphery video providing apparatus according to claim 1, wherein the at least one eye point position comprises a plurality of eye point positions, and the coordinate conversion is performed such that the first and second videos include locations that would be visible to the driver from all of the plurality of eye point positions if not for the structural member.

3. The vehicle periphery video providing apparatus according to claim 1, further comprising: an eye point position acquisition device adapted to acquire information regarding the eye point position of the driver, wherein the coordinate conversion performed by the video processing device is further based on the information acquired by the eye point position acquisition device.

4. The vehicle periphery video providing apparatus according to claim 1, wherein, when a distance to the obstruction is greater than or equal to a predetermined distance, the video processing device does not set the vertical reference surface at the position of the obstruction, but instead sets the vertical reference surface on a ground.

5. The vehicle periphery video providing apparatus according to claim 1, wherein, when distances to a plurality of the obstructions are detected by the distance detection device, the video processing device sets the vertical reference surface at a position of a closest obstruction among the plurality of obstructions.

6. The vehicle periphery video providing apparatus according to claim 1, wherein the video processing device is further adapted to set a second reference surface on a ground, perform the coordinate conversion for location in front of the obstruction based on the second reference surface, and perform the coordinate conversion for other locations based on the vertical reference surface.

7. A method for providing a vehicle periphery video the method comprising:
   shooting a first video of the periphery of a vehicle at a location that is not visible to a driver due to a structural member of the vehicle from a first location;
   shooting a second video of the periphery of the vehicle at the location that is not visible to the driver due to the structural member of the vehicle, from a second location that is different from the first location;
   detecting a distance to an obstruction present in a direction of the shooting;
   setting a vertical reference surface at a location of the obstruction;
   performing coordinate conversion on the first and second videos based on (i) the location of the vertical reference surface, (ii) information regarding at least one eye point position of the driver, and (iii) information regarding an installed state of the display device;
   providing a synthesis processed video by preforming video synthesis processing on the first and second videos, the synthesis processing comprising:
      comparing pixel values of each pixel of the first video with pixel values of each corresponding pixel of the second video,
      when a pixel value of a pixel of the first video is the same as a pixel value of a corresponding pixel of the second video, setting the pixel value of the compared pixels as the pixel value of the corresponding pixel in the synthesis processed video, and
      when a pixel value of a pixel of the first video is different from a pixel value of a corresponding pixel of the second video, determining an average of pixel values of peripheral pixels of the compared pixels and setting the average as the pixel value of the corresponding pixel in the synthesis processed video; and
   displaying the synthesis processed video, the display device being disposed at a location of the structural member.

8. A vehicle periphery video providing apparatus comprising:
   means for shooting a first video of the periphery of a vehicle at a location that is not visible to a driver due to a structural member of the vehicle;
   means for shooting a second video of the periphery of the vehicle at the location that is not visible to the driver due to the structural member of the vehicle, the means for shooting the second video being located separately from the means for shooting the first video;

means for detecting a distance to an obstruction present on a shooting direction side of the means for shooting the first video and the second video;

means for:
- setting a vertical reference surface at a location of the obstruction,
- performing coordinate conversion on the first and second videos based on (i) the location of the vertical reference surface, (ii) information regarding at least one eye point position of the driver, and (iii) information regarding an installed state of the display device, and
- providing a synthesis processed video by performing video synthesis processing on the first and second videos, the synthesis processing comprising:
  - comparing pixel values of each pixel of the first video with pixel values of each corresponding pixel of the second video,
  - when a pixel value of a pixel of the first video is the same as a pixel value of a corresponding pixel of the second video, setting the pixel value of the compared pixels as the pixel value of the corresponding pixel in the synthesis processed video, and
  - when a pixel value of a pixel of the first video is different from a pixel value of a corresponding pixel of the second video, determining an average of pixel values of peripheral pixels of the compared pixels and setting the average as the pixel value of the corresponding pixel in the synthesis processed video; and means for displaying the synthesis processed video, the means for displaying being disposed at a location of the structural member.

* * * * *